United States Patent
Bourgeois et al.

(10) Patent No.: US 6,798,935 B2
(45) Date of Patent: Sep. 28, 2004

(54) SWITCHING DEVICE, PARTICULARLY FOR OPTICAL SWITCHING

(75) Inventors: Claude Bourgeois, Bôle (CH); Patrick Debergh, Cressier (BE); Stephan Gonseth, Epalinges (CH); Grégoire Perregaux, Saint-Blaise (CH); Felix Rudolf, Corcelles (CH); Appolonius Van Der Wiel, Tervuren (NL)

(73) Assignee: Colibrys S.A., Neuchatel (CH)

( * ) Notice: Subject to any disclaimer, the term of this patent is extended or adjusted under 35 U.S.C. 154(b) by 136 days.

(21) Appl. No.: 10/048,126
(22) PCT Filed: Feb. 23, 2001
(86) PCT No.: PCT/CH01/00118
§ 371 (c)(1),
(2), (4) Date: Mar. 26, 2002
(87) PCT Pub. No.: WO01/63337
PCT Pub. Date: Aug. 30, 2001

(65) Prior Publication Data
US 2002/0118911 A1 Aug. 29, 2002

(30) Foreign Application Priority Data
Feb. 25, 2000 (EP) ............................. 00810162

(51) Int. Cl.⁷ .............................. G02B 6/26; G02B 6/42
(52) U.S. Cl. ......................................................... 385/16
(58) Field of Search ........................................ 385/16–23

(56) References Cited

U.S. PATENT DOCUMENTS

| | | | |
|---|---|---|---|
| 5,024,500 A | 6/1991 | Stanley et al. | 350/96.15 |
| 5,226,099 A | 7/1993 | Mignardi et al. | 385/19 |
| 5,612,815 A | 3/1997 | Labeye et al. | 359/320 |
| 5,794,761 A | 8/1998 | Renaud et al. | 200/181 |
| 6,154,590 A * | 11/2000 | Jin et al. | 385/37 |
| 6,463,189 B1 * | 10/2002 | Wu et al. | 385/16 |
| 6,535,663 B1 * | 3/2003 | Chertkow | 385/18 |
| 6,591,037 B2 * | 7/2003 | Yonekubo | 385/32 |

* cited by examiner

Primary Examiner—Nimeshkumar D. Patel
Assistant Examiner—Sumati Krishnan
(74) Attorney, Agent, or Firm—Van Tassel & Associates

(57) ABSTRACT

This switching device comprises at least one cell made up of a moving structure consisting in a flexible cantilever beam (14) and an integral screen (16) attached to said beam, being able to move between two end positions (A, B) and of actuating electrodes (20) for subjecting said structure to forces of attraction to control its movements. The electrodes (20) are located on each side of the beam (14) in such a way as to follow its exact shape when it is in one of its two end positions. A regular movement of the moving structure and a reliable operating of the switching device are thus obtained This invention may be used in optical switching applications.

13 Claims, 3 Drawing Sheets

SWITCHING DEVICE, PARTICULARLY FOR OPTICAL SWITCHING

This invention is a switching device comprising a cell which includes a structure capable of moving back and forth between two end positions and actuating electrodes to subject the structure to attraction forces to control its movement.

Devices of this type are used, in particular, to influence or interrupt the trajectory of optical beams in systems which control, process and store information on pixel-based images. One particularly interesting application for these systems is for printing or high definition reproduction systems.

French patent FR 2 726 135 describes one such device, made in the form of a micro-mechanical structure, and an installation for optical switching using several devices placed in an array.

This invention aims to improve the reliability, durability and performance of the above-mentioned device. In particular, the aim of the invention is to provide a switching device where the cell is equipped with a moving structure which moves in a regular way in a single plane, does not rebound when it reaches its end positions and where there is little risk of remaining stuck to the electrodes.

In order to achieve these goals, the switching device according to the invention is characterised by the actuating electrodes of its cell being positioned on both sides of the moving structure, in such a way as to follow the exact shape of said moving structure when it is at either of its two end positions.

This device also benefits from one or several of the main characteristics listed below.

- The moving structure is formed by a flexible cantilever beam and a screening blade integrally connected to the beam. In this case, the electrodes are only located on each side of the beam.
- Adjacent to each electrode there is at least one stopper serving as a stop for the beam and intended to prevent it from coming into contact with the electrode. This stopper is, for instance, located at the free end of the cantilever beam, beyond the screen. Furthermore, it is preferable to provide for several stoppers distributed along the whole length of the electrodes.
- The side walls of the moving structure, stoppers and electrodes are coated with a layer of diamond, preferably made to act as a conductor, or any material with the same properties.
- The switching device is made on a substrate which has a transverse aperture positioned in such a way as to be closed by the screen when the system is in one of its end positions. This aperture has, on the substrate's side opposite the screen, one portion with a greater diameter than its portion located on the side of the screen. It is preferable if this portion is conical.
- The beam has either a 'T' shaped cross-section or any other shaped cross-section able to enhance its out-of-plane rigidity.
- Each electrode connected to a conductor is connected to a control circuit; the connection of the electrode to this conductor may comprise an incorporated fuse.

Other characteristics and advantages of the invention will be shown in the description below, made with regard to the attached drawings in which.

Figure 1:
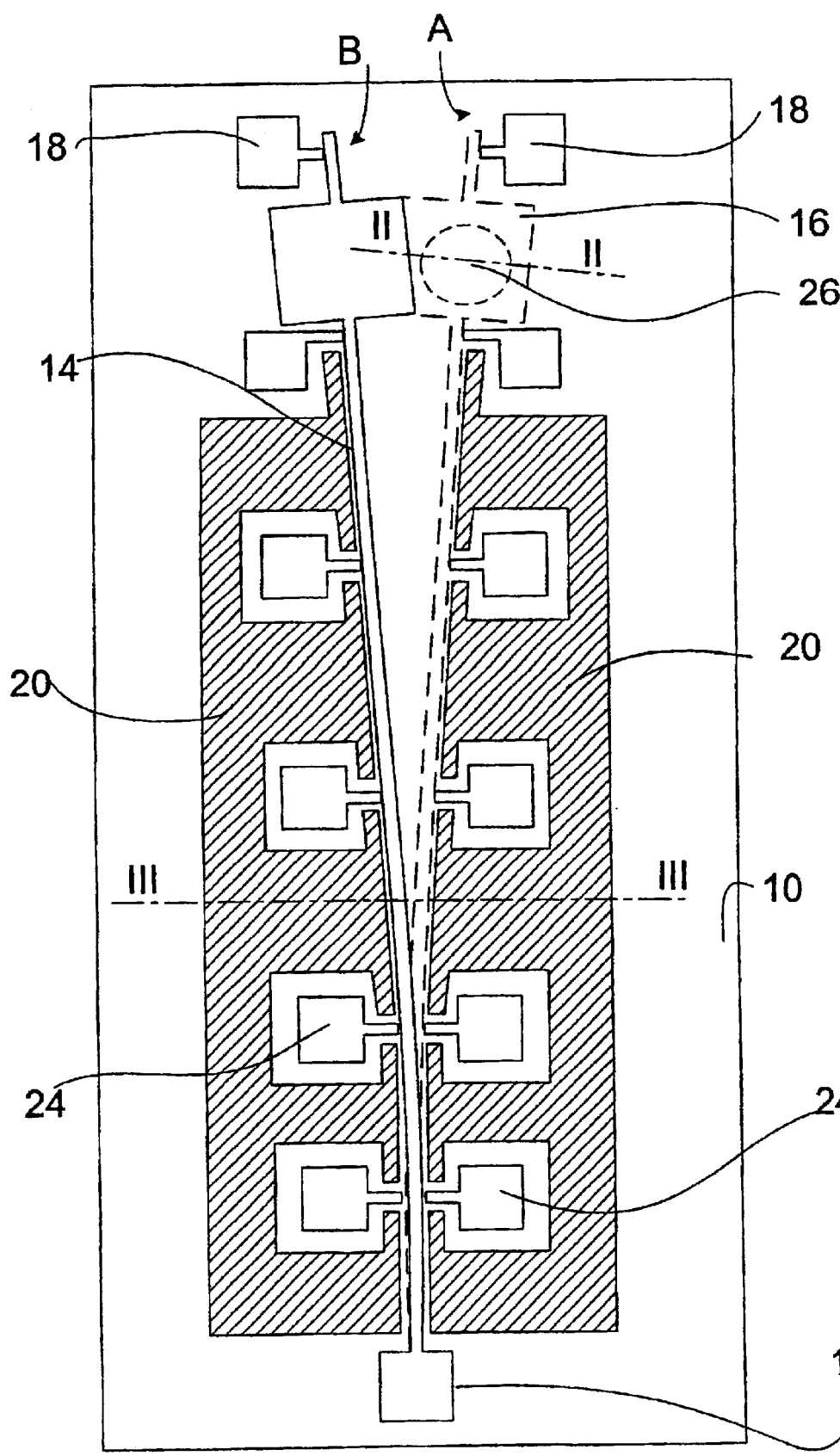
FIG. 1 is a top-view of a switching cell according to the invention.
Figure 2:
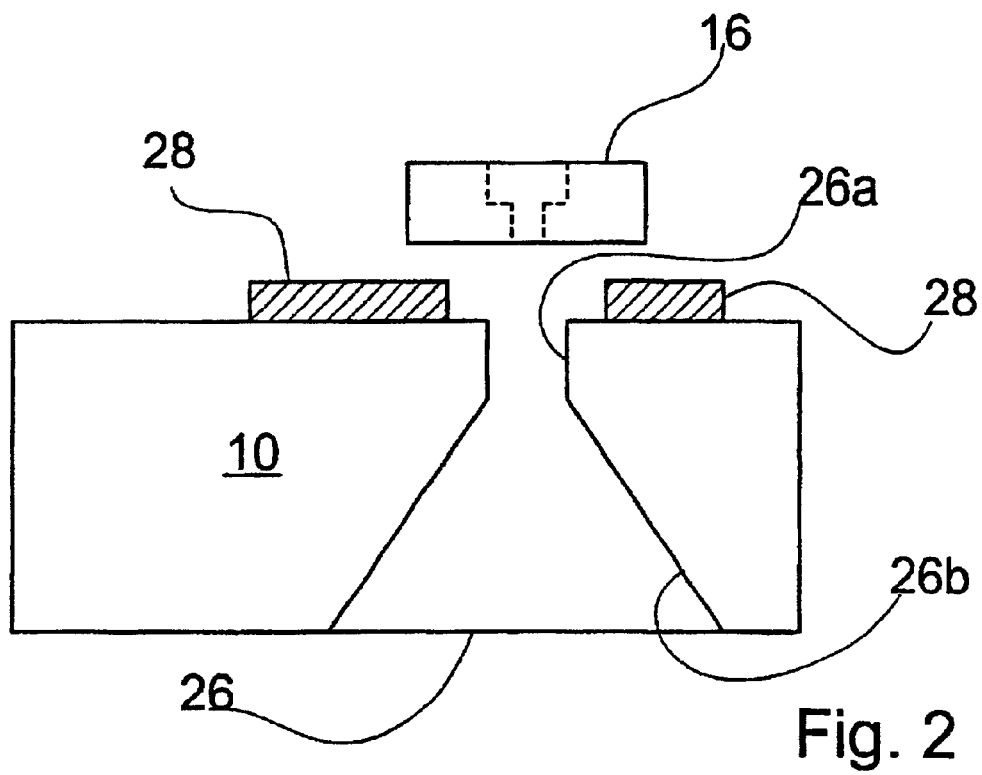
FIG. 2 is a cross-section according to II—II of the cell in FIG. 1.
Figure 3:
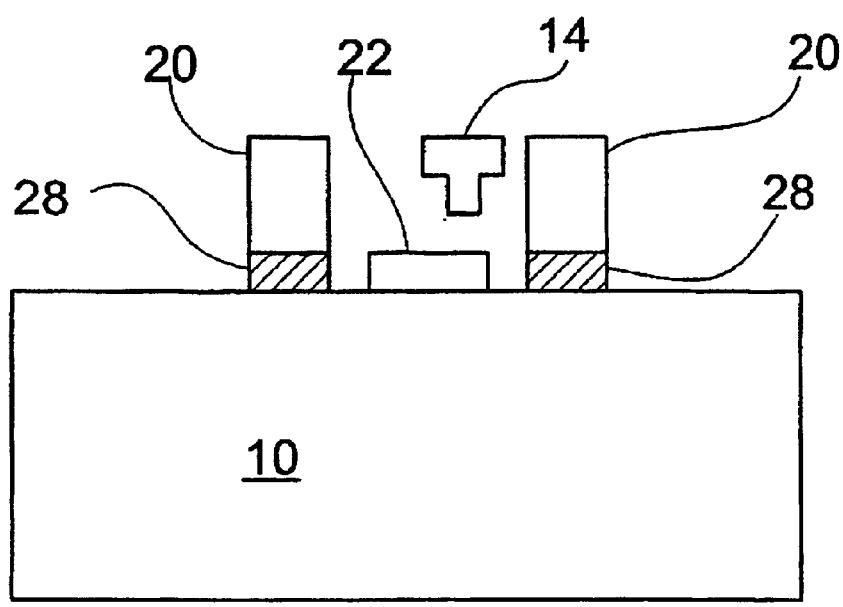
FIG. 3 is a cross-section according to III—III of the cell in FIG. 1.

FIGS. 1 to 3 show a substrate 10, preferably made from silicon, on which is attached, by means of an anchoring area 12, an elastic cantilever beam 14 with, in this particular embodiment, a 'T' shaped cross-section with, on its free end, a rectangular screen 16. It is preferable that the beam 14 and screen 16 are made of polysilicon made to act as a conductor by doping.

The beam 14 and screen 16 make up a moving structure, the screen being able to be moved alternately between the two end positions, A and B respectively, represented by solid and dotted lines. These positions are defined by two end stoppers 18, located on the substrate 10, which act to stop the beam 14.

The screen is brought to these end positions under the effect of electrostatic forces generated by a pair of addressing electrodes 20, made of doped polysilicon and attached to the substrate by an isolating layer 22, on both sides of the beam 14 and along its length, in such a way as to follow its exact shape as closely as possible without, however, touching it, when the screen occupies positions A and B respectively.

Preferably, the isolating layer 22 is formed by a coating of silicon dioxide (SiO2) deposited on the substrate and a layer of silicon nitride (Si3N4) deposited on the dioxide coating.

The electrodes 20 have, along their length, zones within which are located pairs of stoppers 24, which may, for instance, be identical to the end stoppers 18, one of the five in the example given, electrically isolated from the electrodes and intended to limit movements of the beam so that it does not come into contact with the electrodes.

It is preferable if the side walls of the beam 14, stoppers 18, 24 and electrodes 20 are coated with a diamond layer made to be hydrophobic and conducting by means of an appropriate doping treatment, known by those skilled in the art. As well as diamond, any other material which has the same properties or such other properties as to avoid in-use stiction, particularly a polymer, self-assembled mono-layers, teflon or alike may also be used for this coating.

At the centre of the portion closed by the screen 16 when it is in position A, the substrate 10 has a transverse aperture 26 which, on the screen side, has a preferably cylindrical portion 26a of a slightly smaller diameter to that of the screen side, and a gradually widening portion 26b which is preferably conical. It should be noted that instead of being rectangular, the screen might be of any shape and size which makes it capable to cover the aperture when the beam is in its closed position.

According to an advantageous embodiment of the invention, the substrate 10 is made of a transparent material, such as quartz.

In its central portion, above which the beam 14 and the screen 16 move, the substrate is coated with a doped polysilicon layer 28 electrically connected to the beam, stoppers and screen in such a way as to have the same potential and to thus prevent any attraction between them.

The cell described is preferably not used individually, but in association with other identical cells arranged in lines and columns and forming a regular array which, as already known in the art, may be, among other arrangements, rectangular, honeycombed or hexagonal.

Figure 4:
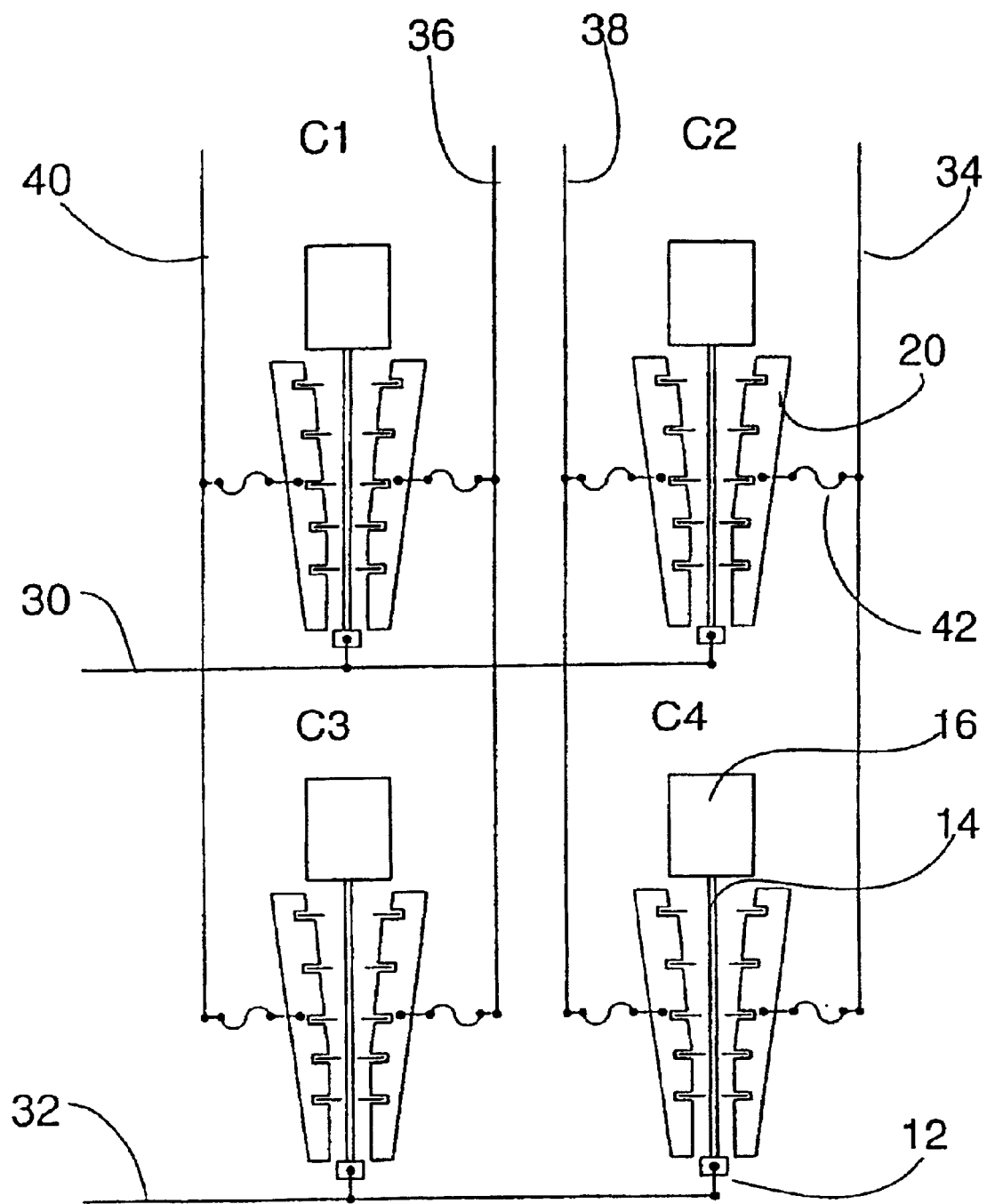
FIG. 4 is a schematic representation of a four cell array with their interconnections.

FIG. 4 shows, schematically, four identical cells C1, C2, C3 and C4, located in an array made up of two rows and two columns. The beam 14, the screen 16 and the pair of electrodes 20 can be found.

The anchoring areas 12 of cells C1 and C2 on the upper row are connected to a common line conductor 30. In the same way, the anchoring areas 12 of cells C3 and C4 on the lower row are connected to another common line conductor 32.

The right-hand electrodes 20 of the right-hand cells C2 and C4 are connected to a common right-hand column conductor 34, while the left-hand electrodes 20 of these cells are connected to a common left-hand column conductor 38. In the same way, the right-hand electrodes 20 of the left-hand cells C1 and C3 are connected to another common column conductor 36, while the left-hand electrodes 20 of these cells are connected to another common column conductor 40.

For details on how to control cells in this type of array, reference is made to the above-mentioned patent FR 2 726 135.

It is known that, despite the precautions taken, and in particular, the presence of stoppers 18, 24, there may be a risk of short-circuit, caused, in particular, by the beam 14 coming into contact with an electrode 20. In order to prevent such an accident from causing the failure of all the cells in the same line and or column, which can occur in known systems, it is proposed that the connection of each of the electrodes 20 with its column conductor to be made, as shown in FIG. 4, by the intermediary of a fuse 42 which, for instance, could be made in the form of a narrow section of the connection line.

A switching cell is thus produced for which the main advantages when compared to known embodiments, particularly as described in patent FR 2 726 135, are listed below:

Due to the fact that, on the one hand, the electrodes are positioned in such a way as to exactly match the beam when it is in either of its two end positions and that, on the other hand, the screen itself is not subjected to the direct action of the electrodes, the movement of the moving structure becomes regular, in a single plane, and is free from—or at least has limited—rebounds.

The presence of stoppers distributed along the length of the electrodes contributes equally to this operation in a smooth way while at the same time reducing the risk of the beam sticking to the stoppers.

The structured section of the beam prevents out-of-plane bending and therefore also contributes to the system always moving parallel to the substrate.

The presence of a conductive diamond coating on the side walls as regards the beam, electrodes and stoppers prevents the accumulation of charges that cause the beam to stick to the stoppers.

The fuse located between each electrode and the conductor of the associated column and/or line will limit the consequences of a short-circuit occurring in a cell.

Finally, the conical section of the aperture in the substrate prevents loss of light and significantly improves the optical transmission of the device.

What is claimed is:

1. A switching device comprising at least one cell made up of a moving structure capable of moving between two end positions and fixed actuating electrodes for subjecting said moving structure to forces of attraction to control its movement, said moving structure being movable relative to said electrodes and electrodes being located on each side of the moving structure in such a way as to follow its exact shape when it is in one of its two end positions, said moving structure comprising a flexible cantilever beam and an integral screen attached to said beam, wherein said electrodes are located only on each side of said beam.

2. The switching device of claim 1, further comprising, associated with each electrode, at least one stopper serving as a stop for said beam and for the purpose of preventing said beam coming into contact with said electrode.

3. The switching device of claim 2, said stopper being located at the free end of said cantilever beam, beyond said screen.

4. The switching device of claim 2, further comprising a plurality of stoppers distributed along the length of said electrodes.

5. The switching device of claim 2, wherein the side walls of the moving structure, stoppers and electrodes are coated with a diamond layer.

6. The switching device of claim 5, characterized in that said diamond layer is conductive.

7. The switching device of claim 1, said switching device being made on a substrate.

8. The switching device of claim 7, said substrate being made of transparent material.

9. The switching device of claim 7, said substrate having a transverse aperture positioned in such a way as to be closed by the screen when the system is in one of its end positions.

10. The switching device of claim 9, said aperture, on the opposite side of the screen, having a portion of a greater diameter than the portion located on the side of the screen.

11. The switching device of claim 10, said portion of greater diameter being conical.

12. The switching device of claim 1, said beam presenting a 'T' shaped section.

13. The switching device of claim 1, each electrode being connected to a conductor linked to a control circuit, the electrode connection with said conductor comprising a fuse.

* * * * *